United States Patent
Verdant

(10) Patent No.: US 8,144,935 B2
(45) Date of Patent: Mar. 27, 2012

(54) MOVEMENT DETECTION METHOD AND DEVICE WITH A THRESHOLDING ALGORITHM PER ENVELOPE

(75) Inventor: Arnaud Verdant, La Tour du Pin (FR)

(73) Assignee: Commissariat a l'Energie Atomique, Paris (FR)

( * ) Notice: Subject to any disclaimer, the term of this patent is extended or adjusted under 35 U.S.C. 154(b) by 885 days.

(21) Appl. No.: 12/172,559

(22) Filed: Jul. 14, 2008

(65) Prior Publication Data
US 2009/0022372 A1    Jan. 22, 2009

(30) Foreign Application Priority Data
Jul. 16, 2007 (FR) .................... 07 56517

(51) Int. Cl.
*G06K 9/00* (2006.01)
*H04N 7/12* (2006.01)

(52) U.S. Cl. .................... 382/107; 375/240.16

(58) Field of Classification Search .......... 382/107; 375/240.16, E7.076; 348/35
See application file for complete search history.

(56) References Cited

OTHER PUBLICATIONS (Stefan et al; "Adaptive change detection for real-time surveillance Applications", IEEE, VS 2000, Dublin, Ireland, Jul. 2000, pp. 37-45).*
U.S. Appl. No. 12/172,409, filed Jul. 14, 2008, Verdant.
U.S. Appl. No. 12/172,460, filed Jul. 14, 2008, Verdant.
J. Richefeu, et al. Détection et Analyse Du Mouvement Sur Système de Vision à Base De Rétine Numérique, Thesis-University Paris 6, XP 002478406, Dec. 14, 2006, 272 Pages (with Translation of Category of Cited Documents).
A. Verdandt, et al. "Low Power Motion Detection with Low Spatial and Temporal Resolution for CMOS Image Sensor", The International Workshop on Computer Architecture for Machine Perception and Sensing, Sep. 2006, pp. 12-17.
Stefan Huwer, et al. "Adaptive Change Detection for Real-Time Surveillance Applications," Third IEEE International Workshop on Visual Surveillance—VS-2000, Dublin, Ireland, Jul. 2000, pp. 37-45.
Fredrik Gustafsson, "Adaptive Filtering and Change Detection," Copyright © 2000 John Wiley & Sons, Ltd. ISBNs: 0-471-49287-6 (Hardback); 0-470-84161-3 (Electronic).

* cited by examiner

*Primary Examiner* — Vu Le
*Assistant Examiner* — Amara Abdi
(74) *Attorney, Agent, or Firm* — Oblon, Spivak, McClelland, Maier & Neustadt, L.L.P.

(57) ABSTRACT

A movement detection method that includes calculating a first mean of a signal designed to be supplied by at least one pixel of a pixel matrix which corresponds to a captured image. The movement detection method further includes calculating a second signal, second mean, third mean and fourth mean wherein a movement is detected from the result of at least one comparison made of the signal and the second, third and fourth mean.

31 Claims, 2 Drawing Sheets

MOVEMENT DETECTION METHOD AND DEVICE WITH A THRESHOLDING ALGORITHM PER ENVELOPE

TECHNICAL FIELD

This document relates to the field of movement detection and more particularly that of image sensors, such as CMOS imaging devices used in the visible or infrared range, wherein a movement detection method is used.

STATE OF THE PRIOR ART

Movement detection involves detecting the movement of moving elements with respect to fixed elements in a field of captured images. These elements may be for example vehicles or even people. Such movement detection consists of isolating, among the signals supplied by an image sensor, those related to the moving elements, for example by detecting the significant variations on the mean or variance of a signal of a pixel or a group of pixels indicating a change in the nature of the element captured in this pixel or group of pixels, with respect to those related to the fixed elements of which the mean or variance remains for example substantially constant in time. For this purpose, detection methods or algorithms are used.

A first approach consists of using a "recursive average" algorithm for such movement detection. This algorithm is based on an estimated background calculation, which is to say of the fixed elements found in all of the captured images. Which is to say $X_n$ is the background, or the mean, corresponding to an image n, $S_n$ is the signal corresponding to the acquired image n and $1/N$ is a weighting coefficient, therefore:

$$X_n = X_{n-1} - \frac{1}{N} X_{n-1} + \frac{1}{N} S_n$$

A comparison is then made between a chosen threshold value $T_h$ and $|S_n - X_n|$. If the value obtained is positive, this means that a movement has been detected. $X_n$ and $S_n$ may be variables obtained from a signal supplied by a pixel or by considering several signals supplied by several pixels, for example a group of pixels located next to one another that form a macropixel, like a single signal, taking for example the mean of these signals.

Such an algorithm has especially as disadvantage a lack of robustness in the detection as the detection threshold $T_h$ is determined à priori, prior to the algorithm being used, and is global for all of the pixels of the matrix. This disadvantage results in low precision of the location of the movements in the captured images. The low pass type filtering carried out by this algorithm induces dephasing, and consequently a delay in the response with respect to the signal. This delay results in a "drag effect" when the moving elements detected are shown, which is to say that the signals supplied by the pixels which no longer capture part of a moving element are still considered as signals which represent part of the moving element.

A second approach consists of using a "sigma-delta" algorithm for the movement detection. This algorithm permits significant variations of the signal to be detected by calculating two variables that can be assimilated to the mean value and the variance of the signal. FIG. 1 is a diagrammatical representation of a movement detection device using a sigma-delta algorithm.

Firstly, the sigma-delta mean $M1_n$ is calculated, with a constant incrementation and decrementation value, for example 1, of the signal $S_n$ corresponding to the acquired image n. For this purpose, the signal $S_n$ is sent as an input of the first means of calculating the sigma-delta mean 2. These means 2 first carry out an initialisation $M1_0 = S_0$. For the following images, which is to say for $n > 0$, these means 2 compare $M1_{n-1}$ and $S_n$. If $M1_{n-1} < S_n$, then the value of $M1_{n-1}$ is incremented such that $M1_n = M1_{n-1} + 1$. If $M1_{n-1} > S_n$, then the value of $M1_{n-1}$ is decremented such that $M1_n = M1_{n-1} - 1$. The value of the signal $\Delta_n = |M1_n - S_n|$ is calculated by a subtractor 4 and absolute value calculation means 6. The calculation of $N \times \Delta n$ is then made by the multiplier 8, wherein N is a constant corresponding to the adaptive threshold of the algorithm whose value is chosen in function of the complexity of the scene. The calculation of a sigma-delta mean $M2_n$ of $N \cdot \Delta n$ is then made and sent as an input of second means of calculating the sigma-delta mean 10. Next, the initialisation $M2_0 = 0$ is carried out first. For the following images, which is to say for $n > 0$, a comparison is made of $M2_{n-1}$ and $N \cdot \Delta_n$. If $M2_{n-1} < N \cdot \Delta_n$, then the value of $M2_{n-1}$ is incremented such that $M2_n = M2_{n-1} + 1$. If $M2_{n-1} > N \cdot \Delta_n$, then the value of $M2_{n-1}$ is decremented such that $M2_n = M2_{n-1} - 1$. Finally, a comparison is made by a comparator 12 of the signal $\Delta_n$ and $M2_n$. If $M2_n < \Delta_n$, this means that a movement has been detected.

As for the recursive average algorithm, the variables $S_n$, $M1_n$, $\Delta_n$ and $M2_n$ may be obtained from a signal supplied by a pixel or by considering several signals supplied by several pixels, for example a group of pixels next to one another, like a single signal, taking for example the mean of these signals.

However, such an algorithm especially has the disadvantage of not filtering high frequency parasite movements which are considered as movements to be detected (for example, a movement of the leaves of a tree or snow falling). Furthermore, the constant N used must be determined à priori, which reduces the adaptability of the detection carried out by this algorithm.

DESCRIPTION OF THE INVENTION

Thus there is a need to propose a method of movement detection which permits the detection of high frequency parasite movements to be reduced or eliminated and which offers more efficient detection, for example in terms of precision of locating the movements, with respect to the methods of the prior art, and which reduces or eliminates the "drag" effect obtained by the methods of the prior art.

Also, there is a need to propose a method of movement detection which requires few calculation and memory hardware resources to be used, and that can be installed analogically in a very low consumption imaging device (with for example a mean consumption equal to approximately several hundred µW).

For this purpose, one embodiment proposes a method of movement detection comprising at least the following steps:
the calculation of a first mean $M1_n$ of a signal $S_n$ designed to be supplied by at least one pixel of a pixel matrix which corresponds to an n-th captured image, in function of the value of the signal $S_n$ and/or a previous value $M1_{n-1}$;
the calculation of a signal $\Delta_n = |M1_n - S_n|$;
the calculation of a second mean $M2_n$ of the signal $\Delta_n$ in function of the value of a previous value $M2_{n-1}$ and/or the value of the signal $\Delta_n$;
the calculation of a third mean $M3_n$ of the signal $(S_n - k_1 \cdot M2_n)$ in function of a previous value $M3_{n-1}$ and/or the value of the signal $(S_n - k_1 \cdot M2_n)$;

the calculation of a fourth mean $M4_n$ of the signal $(S_n + k_2 \cdot M2_n)$ in function of a previous value $M4_{n-1}$ and/or the value of the signal $(S_n + k_2 \cdot M2_n)$;

wherein a movement is considered as detected from the result of at least one comparison made on the signals $S_n$, $(M3_n - M2_n)$ and $(M4_n + M2_n)$;

where n: natural whole number;

and $k_1$ and $k_2$: non-null positive real numbers.

Consequently, the significant variations of the signal emitted by a pixel or a macropixel may be detected by "thresholding" the variations of the signal by the envelope of the signal $S_n$ itself, which is to say by defining adaptive upper and lower threshold values for the movement detection depending on the activity of the captured signal $S_n$. Moreover, this thresholding can keep the sign of the emitted signal derivative, which it is not possible with a thresholding realized on the absolute value of the difference between the emitted signal and an estimated background.

The adaptability of the detection is also improved by eliminating certain constants that had to determined à priori in the methods of the prior art. The sensitivity of the detection is also adapted locally to the activity of the pixels, which is to say individually for each pixel.

The coefficients $k_1$ and $k_2$ allow a direct adaptation of the upper and lower threshold values depending on the disturbance level in the analyzed images. These coefficients allow an expansion or a reduction of the envelope defined by the detection threshold around $S_n$. For example, it is possible to impose "harder" threshold detection conditions with an expansion of the envelope, thus enables to escape some noise disturbances during movement detection. The values of $k_1$ and $k_2$ may be chosen in function of the environment in which the movement detection is realized, that is in function of the ambient "agitation" in the analyzed images. In an urban environment, the values of $k_1$ and $k_2$ may be equals to 1. Preferably, the values of $k_1$ and/or $k_2$ may be comprised between 0 and 3. Moreover, the values of $k_1$ and $k_2$ may be similar or not, depending on whether a symmetrical or an unsymmetrical envelope is needed, in function of disturbances that are not to be detected as movements.

The first mean $M1_n$ may be obtained from the following equation:

$$M1_n = M1_{n-1} - \frac{1}{N_1} M1_{n-1} + \frac{1}{N_1} S_n,$$

where $M1_{-1} = 0$, and $1/N_1$: non-null positive real number.

By choosing an appropriate value of $1/N_1$, the time constant of the calculation of this first mean may be chosen, which may be slow to estimate the background of the images captured.

In one variant, the first mean $M1_n$ may be obtained at least by the following calculation steps:

$M1_0 = S_0$;

and for $n > 0$:

$M1_n = M1_{n-1} + c_1$ when $M1_{n-1} < S_n$;

$M1_n = M1_{n-1} - c_1$ when $M1_{n-1} > S_n$;

Where $c_1$: non-null positive real number.

The second mean $M2_n$ may be obtained from the following equation:

$$M2_n = M2_{n-1} - \frac{1}{N_2} M2_{n-1} + \frac{1}{N_2} \Delta_n,$$

where $M2_{-1} = 0$, et $1/N_2$: non-null positive real number.

The second mean $M2_n$ may be also obtained at least by the following calculation steps:

$M2_0 = \Delta_0$;

and for $n > 0$:

$M2_n = M2_{n-1} + c_2$ when $M2_{n-1} < \Delta_n$;

$M2_n = M2_{n-1} - c_2$ when $M2_{n-1} > \Delta_n$;

where $c_2$: non-null positive real number.

The third mean $M3_n$ may be obtained from the following equation:

$$M3_n = M3_{n-1} - \frac{1}{N_3} M3_{n-1} + \frac{1}{N_3} (S_n - k_1 M2_n),$$

Where $M3_{-1} = 0$, and $1/N_3$: non-null positive real number.

In this case, the value of $1/N_3$ may be adjusted in function of the value $|M3_n - S_n|$.

The third mean $M3_n$ may be obtained at least by the following calculation steps:

$M3_0 = (S_0 - k_1 \cdot M2_0)$;

and for $n > 0$:

$M3_n = M3_{n-1} + c_3$ when $M3_{n-1} < (S_n - k_1 \cdot M2_n)$;

$M3_n = M3_{n-1} - c_3$ when $M3_{n-1} > (S_n - k_1 \cdot M2_n)$;

where $c_3$: non-null positive real number.

The fourth mean $M4_n$ may be obtained from the following equation:

$$M4_n = M4_{n-1} - \frac{1}{N_4} M4_{n-1} + \frac{1}{N_4} (S_n + k_2 M2_n),$$

where $M4_{-1} = 0$, and $1/N_4$: non-null positive real number.

In this case, the value of $1/N_4$ may be adjusted in function of the value $|M4_n - S_n|$.

An asymmetry of the thresholding envelope may be realised by the choice of the values of time constants $1/N_3$ and $1/N_4$ which may be dynamically adapted during the method.

For example, when $M4_n < S_n$, $N_4$ may be small, which corresponds to a short time constant $\tau$, for example lower than about 0.5 second (for example equal to 380 ms). When $M4_n > S_n$, $N_4$ may be high, which corresponds to a long time constant $\tau$, for example higher than about 1 second (for example equal to 1.18 s), at a sampling period equal to 25 Hz. The time constant $\tau$ of a mean may be equal to the ratio: sampling period of the image capture/$\ln(1-1/N)^{-1}$, the sampling period corresponding to the period of the signal $S_n$ period (noted period $(S_n)$). Thus, when $M4_n < S_n$, the value of $1/N_4$ may verify the relation:

period $(S_n)/\ln(1-1/N_4)^{-1} < 0.5$ s;

and when $M4_n > S_n$, the value of $1/N_4$ may verify the relation:

period $(S_n)/\ln(1-1/N_4)^{-1} > 1$ s.

Moreover, when $M3_n < S_n$, $N_3$ may be high, which corresponds to a long time constant $\tau$, for example higher than about 1 second, and when $M3_n > S_n$, $N_3$ may be small, which corresponds to a short time constant $\tau$, for example smaller than about 0.5 second. Thus, when $M3_n < S_n$, the value of $1/N_3$ may verify the relation:

period $(S_n)/\ln(1-1/N_3)^{-1} > 1$ s;

and when $M3_n > S_n$, the value of $1/N_3$ may verify the relation:

period $(S_n)/\ln(1-1/N_3)^{-1} < 0.5$ s.

A short time constant may be equal to about 380 ms, and a long time constant may be equal to about 1.18 s. The time constants are here considered at a sampling period of 25 Hz.

Thus, an unsymmetrical thresholding envelope allows adapting the thresholding of positive variations of the signal (comparison of $S_n$ and $M4_n$) and the thresholding of negative variations of the signal (comparison of $S_n$ and $M3_n$). For example, it is possible to realize a filtering of a camera blooming with repeated flashes by imposing "harder" threshold detection conditions on the variations (for example positive in the case of a grey-levels scene and white flashes corresponding to a maximum value of the output signal) induced by flashes et keeping a suitable sensitivity on negatives variations induces by the other darker objects.

The fourth mean $M4_n$ may be obtained at least by the following calculation steps:

$M4_0 = (S_0 + k_2 \cdot M2_0)$;

and for n>0:

$M4_n = M4_{n-1} + c_4$ when $M4_{n-1} < (S_n + k_2 \cdot M2_n)$;
$M4_n = M4_{n-1} - c_4$ when $M4_{n-1} > (S_n + k_2 \cdot M2_n)$;

where $c_4$: non-null positive real number.

The value of the first mean $M1_n$ and/or the second mean $M2_n$ and/or the third mean $M3_n$ and/or the fourth mean $M4_n$ may be respectively greater than a first non-null minimum threshold value $S_{M1n}$ and/or a second non-null minimum threshold value $S_{M2n}$ and/or a third non-null minimum threshold value $S_{M3n}$ and/or a fourth non-null minimum threshold value $S_{M4n}$.

These threshold values may be comprised between approximately 1/250×the dynamic of the signal $S_n$ and 1/25×the dynamic of the signal $S_n$, and for example equal to approximately 1/50×the dynamic of the signal $S_n$, the dynamic of the signal $S_n$ corresponding to the possible maximum value of $|S_n|$ (for example equal to 256 for a 8 bits coded signal).

The comparison may be made between the signals $S_n$ and $(M3_n - M2_n)$ and between the signals $S_n$ and $(M4_n + M2_n)$, wherein a movement is considered as detected when $S_n > (M4_n + M2_n)$ or $S_n < (M3_n - M2_n)$.

In one variant, the method may further comprise, between the calculation step of the fourth mean $M4_n$ of the signal $(S_n + k_2 \cdot M2_n)$ and the comparison step, a calculation step of a fifth mean $M5_n$ of the signal $S_n$ in function of a previous value $M5_{n-1}$ and/or the value of the signal $S_n$, wherein said comparison may be made between the signals $M5_n$ and $(M3_n - M2_n)$ and between the signals $M5_n$ and $(M4_n + M2_n)$, wherein a movement is considered as detected when $M5_n > (M4_n + M2_n)$ or $M5_n < (M3_n - M2_n)$.

In this case, band pass filtering may be generated to eliminate the high frequency parasite movements, as well as the "drag" effect observed in the movement detection methods of the prior art.

The fifth mean $M5_n$ may be obtained from the following equation:

$$M5_n = M5_{n-1} - \frac{1}{N_5} M5_{n-1} + \frac{1}{N_5} S_n,$$

where $M5_{-1} = 0$, and $1/N_5$: non-null positive real number.

In this case, the high frequency parasites of the signal are filtered even more efficiently.

The values of the weighting coefficients 1/N, and the values of the incrementation and decrementation coefficients c in the case of a calculation of a sigma-delta type mean, may be calculated in function of the speed of acquisition of the images, and may be easily determined.

The values of the weighting coefficients 1/N which may be used for the calculation of means $M1_n$ and/or $M2_n$ may be chosen such that the time constants τ of these means are long, for example higher than about 1 second.

The values of the incrementation and decrementation coefficients c which may be used for the calculation of means $M1_n$ and/or $M2_n$ and/or $M3_n$ and/or $M4_n$ may be chosen and adapted during the method in order to satisfy the relation $c < |dS_n/dn|$. In one variant, when the incrementation and decrementation coefficients have fixed values, for example equal to 1, it is possible to adapt a refresh period Tn of the method, that is the period of which the steps of the method are realized, in order to satisfy the relation $c < |\Delta S_n/Tn|$.

Another embodiment also relates to a movement detection device comprising at least:

means of calculating, or a calculator of, a first mean $M1_n$ of a signal $S_n$ designed to be supplied by at least one pixel of a pixel matrix and corresponding to a n-th captured image, in function of the value of the signal $S_n$ and/or a previous value $M1_{n-1}$;

means of calculating, or a calculator of, a signal $\Delta_n = |M1_n - S_n|$;

means of calculating, or a calculator of, a second mean $M2_n$ of the signal $\Delta_n$ in function of a previous value $M2_{n-1}$ and/or the value of the signal $\Delta_n$;

means of calculating, or a calculator of, a third mean $M3_n$ of the signal $(S_n - k_1 \cdot M2_n)$ in function of a previous value $M3_{n-1}$ and/or the value of the signal $(S_n - k_1 \cdot M2_n)$;

means of calculating, or a calculator of, a fourth mean $M4_n$ of the signal $(S_n + k_2 \cdot M2_n)$ in function of a previous value $M4_{n-1}$ and/or the value of the signal $(S_n + k_2 \cdot M2_n)$;

a movement is considered as detected from the result at the output of the means of comparison, or a comparator, making at least one comparison of the signals $S_n$, $(M3_n - M2_n)$ and $(M4_n + M2_n)$;

where n: natural whole number;

and $k_1$ and $k_2$: non-null positive real numbers.

The means of calculating, or the calculator of, the first mean $M1_n$ may carry out at least the following operation:

$$M1_n = M1_{n-1} - \frac{1}{N_1} M1_{n-1} + \frac{1}{N_1} S_n,$$

where $M1_{-1} = 0$, and $1/N_1$: non-null positive real number.

The means of calculating, or the calculator of, the first mean $M1_n$ may at least comprise:

means of initialising the value of $M1_0$ to the value of $S_0$;

means of comparing, or a comparator of, the value of the signal $M1_{n-1}$ and the value of the signal $S_n$;

means of incrementing and decrementing the value of $M1_n$ by a constant $c_1$, where $c_1$: non-null positive real number.

The means of calculating, or the calculator of, the second mean $M2_n$ may carry out at least the following operation:

$$M2_n = M2_{n-1} - \frac{1}{N_2}M2_{n-1} + \frac{1}{N_2}\Delta_n,$$

where $M2_{-1}=0$, and $1/N_2$: non-null positive real number.

The means of calculating, or the calculator of, the second mean $M2_n$ may at least comprise:

means of initialising the value of $M2_0$ to the value of $\Delta_0$;

means of comparing, or a comparator of, the value of the signal $M2_{n-1}$ and the value of the signal $\Delta_n$;

means of incrementing and decrementing the value of $M2_n$ by a constant $c_2$, where $c_2$: non-null positive real number.

The means of calculating, or the calculator of, the third mean $M3_n$ may carry out at least the following operation:

$$M3_n = M3_{n-1} - \frac{1}{N_3}M3_{n-1} + \frac{1}{N_3}(S_n - k_1 M2_n),$$

where $M3_{-1}=0$, and $1/N_3$: non-null positive real number.

In this case, the means of calculating, or the calculator of, the third mean $M3_n$ may further comprise means of adjusting the value of $1/N_3$ in function of the value $|M3_n-S_n|$ such that:

when $M3_n<S_n$, the value of $1/N_3$ verify the relation: period $(S_n)/\ln(1-1/N_3)-^1>1$ s;

and when $M3_n>S_n$, the value of $1/N_3$ verify the relation: period $(S_n)/\ln(1-1/N_3)^{-1}<0.5$ s.

The means of calculating, or the calculator of, the third mean $M3_n$ at least comprise:

means of initialising the value of $M3_0$ to the value of $(S_0-k_1 \cdot M2_0)$;

means of comparing, or a comparator of, the value of the signal $M3_{n-1}$ and the value of the signal $(S_n-k_1 \cdot M2_n)$;

means of incrementing and decrementing the value of $M3_n$ by a constant $c_3$, where $c_3$: non-null positive real number.

The means of calculating, or the calculator of, the fourth mean $M4_n$ may carry out at least the following operation:

$$M4_n = M4_{n-1} - \frac{1}{N_4}M4_{n-1} + \frac{1}{N_4}(S_n + k_2 \cdot M2_n),$$

where $M4_{-1}=0$, and $1/N_4$: non-null positive real number.

In this case, the means of calculating, or the calculator of, the fourth mean $M4_n$ may further comprise means of adjusting the value of $1/N_4$ in function of the value $|M4_n-S_n|$ such that:

when $M4_n<S_n|$ the value of $1/N_4$ verify the relation: period $(S_n)/\ln(1-1/N_4)-^1<0.5$ s;

and when $M4_n>S_n$, the value of $1/N_4$ verify the relation: period $(S_n)/\ln(1-1/N_4)^{-1}>1$ s.

The means of calculating, or the calculator of, the fourth mean $M4_n$ may at least comprise:

means of initialising the value of $M4_0$ to the value of $(S_0+k_2 \cdot M2_0)$;

means of comparing, or a comparator of, the value of the signal $M4_{n-1}$ and the value of the signal $(S_n+k_2 \cdot M2_n)$;

means of incrementing and decrementing the value of $M4_n$ by a constant $c_4$, where $c_4$: non-null positive real number.

The means of comparison, or the comparator, may be means of comparing, or a comparator of, the signals $S_n$ and $(M3_n-M2_n)$ and means of comparing, or a comparator of, the signals $S_n$ and $(M4_n+M2_n)$, wherein a movement may be considered as detected when $S_n>(M4_n+M2_n)$ or $S_n<(M3_n-M2_n)$.

The device may further comprise means of calculating, or a calculator of, a fifth mean $M5_n$ of the signal $S_n$ in function of a previous value $M5_{n-1}$ and/or the value of the signal $S_n$, wherein the means of comparison, or the comparator, may be means of comparing, or a comparator of, the signals $M5_n$ and $(M3_n-M2_n)$ and means of comparing, or a comparator of, the signals $M5_n$ and $(M4_n+M2_n)$, wherein a movement is considered as detected when $M5_n>(M4_n+M2_n)$ or $M5_n<(M3_n-M2_n)$.

In this case, the means of calculating, or the calculator of, the fifth mean $M5_n$ may carry out at least the following operation:

$$M5_n = M5_{n-1} - \frac{1}{N_5}M5_{n-1} + \frac{1}{N_5}S_n,$$

where $M5_{-1}=0$, and $1/N_5$: non-null positive real number.

The means of comparison, or the comparator, may at least comprise an operational amplifier, or transconductance amplifier.

Finally, this invention also relates to an image capture device comprising at least one pixel matrix and one movement detection device as previously described.

BRIEF DESCRIPTION OF THE DRAWINGS

This invention will be more clearly understood upon reading the following description of embodiments provided purely by way of illustration and in no way restrictively, in reference to the appended drawings in which.

Identical, similar or equivalent parts of the various figures described below have the same numerical references so as to facilitate the passage from one figure to another.

The different parts shown in the figures are not necessarily to a uniform scale, to make the figures easier to read.

The different possibilities (variants and embodiments) should be understood as not being mutually exclusive and may be combined with one another.

DETAILED DESCRIPTION OF SPECIFIC EMBODIMENTS

Figure 1:
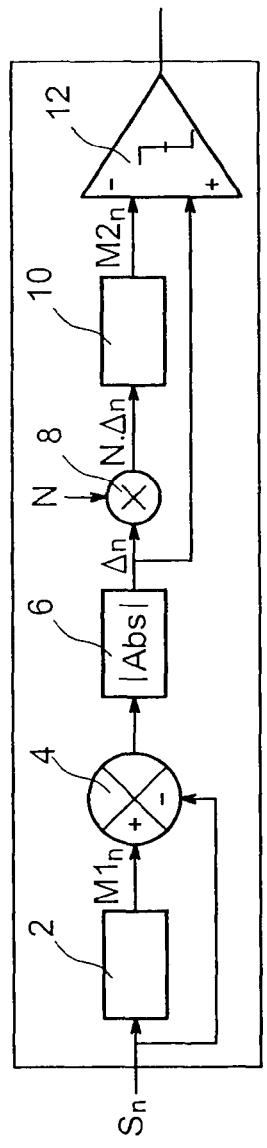
FIG. 1 shows diagrammatically a sigma-delta algorithm movement detection device.
Figure 2:
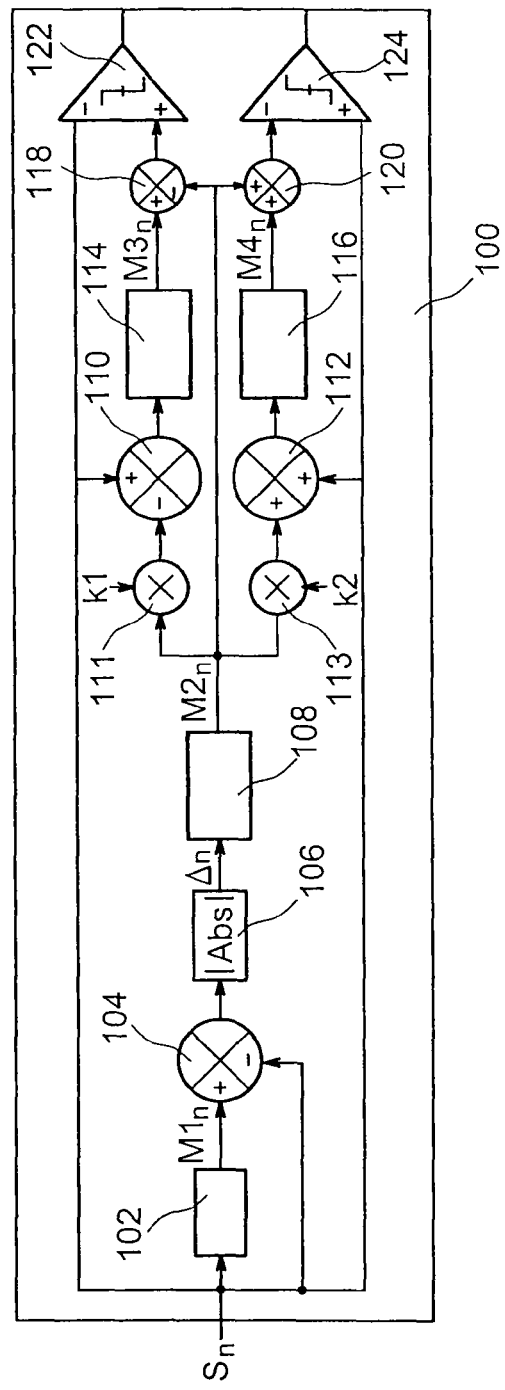
FIG. 2 shows diagrammatically a movement detection device with a thresholding algorithm per envelope.

A movement detection device 100 and method with a thresholding algorithm per envelope, according to one specific embodiment will now be described in relation to FIG. 2.

A first step of this method is to estimate the background of the images in which a movement is to be detected, wherein the background is formed by the fixed elements in the captured images. For this purpose, firstly, using means 102, a first recursive average $M1_n$ is calculated wherein an important weighting coefficient $1/N_1$ of a signal $S_n$ corresponding to the signal supplied by a pixel, or a group of pixels also called macropixel, of an n-th acquired image. Wherein:

$$M1_n = M1_{n-1} - \frac{1}{N_1} M1_{n-1} + \frac{1}{N_1} S_n,$$

In this calculation of the first mean $M1_n$, the choice of the value of the weighting coefficient $1/N_1$ is important so that only the fixed elements in the acquired images are conserved. For an image capture device operating at 25 Hz, for example a weighting coefficient such as $1/N_1=1/(2^7$ is chosen. The value of the weighting coefficient $1/N_1$ is chosen in function of the amplitude and the frequency of the variations of the signal $S_n$.

Consequently, the value $M1_n$ calculated for a pixel or a macropixel corresponds to the luminous intensity emitted by the fixed element captured by this pixel or this macropixel, even if one or several moving elements temporarily pass before this pixel or this macropixel during the movement detection.

In one variant of this embodiment, the first mean $M1_n$ may not be a recursive average, but a sigma-delta mean, for example with a low level of incrementation and decrementation $c_1$ (for example equal to 1), also permitting the estimation of the background to be calculated. A similar effect may be obtained by choosing a low refresh period. This low level of incrementation and decrementation corresponds to an important time constant in a recursive mean calculation. For this purpose, firstly the initialisation $M1_0=S_0$ is carried out. For the following images, which is to say for n>0, $M1_{n-1}$ and $S_n$ are compared. If $M1_{n-1}<S_n$, then the value of $M1_{n-1}$ is incremented such that $M1_n=M1_{n-1}+c_1$. If $M1_{n-1}>S_n$, then the value of $M1_{n-1}$ is decremented such that $M1_n=M1_{n-1}-c_1$.

Then the signal $\Delta_n=|M1_n-S_n|$ is calculated using a subtractor 104 and absolute value calculation means 106.

Then a second sigma-delta mean $M2_n$, with a constant level of incrementation and decrementation $c_2$ (for example equal to 1) of the signal $\Delta_n$ is calculated using calculating means 108.

To calculate this second mean $M2_n$, firstly the initialisation $M2_0=\Delta_0$ is carried out. For the following images, which is to say for n>0, $M2_{n-1}$ and $\Delta_n$ are compared. If $M2_{n-1}<\Delta_n$, then the value of $M2_{n-1}$ is incremented such that $M2_n=M2_{n-1}+c_2$. If $M2_{n-1}>\Delta_n$, then the value of $M2_{n-1}$ is decremented such that $M2_n=M2_{n-1}-c_2$.

It is also possible that this second mean $M2_n$ is not a sigma-delta type mean, but a recursive type mean. In this case, the calculation means 108 calculate the second recursive mean $M2_n$ with a high time constant $1/N_2$, of the signal $\Delta_n$. This second recursive mean $M2_n$ is obtained with the following calculation:

$$M2_n = M2_{n-1} - \frac{1}{N_2} M2_{n-1} + \frac{1}{N_2} \Delta_n$$

The weighting coefficient $1/N_2$ is chosen in function of the amplitude and the frequency of the variations of the envelope signal $\Delta_n$. For example $N_2=2^6$.

Then the signal $S_n-k_1 \cdot M2_n$ is calculated using a subtracter 110 and a multiplier 111. In this embodiment, the value of $k_1$ is equal to 1.

The device 100 also comprises means 114 of calculating a third recursive mean $M3_n$. This third recursive mean $M3_n$ is obtained using the following calculation:

$$M3_n = M3_{n-1} - \frac{1}{N_3} M3_{n-1} + \frac{1}{N_3} (S_n - k_1 \cdot 2_n)$$

The weighting coefficient $1/N_3$ is chosen in function of the amplitude and the frequency of the variations of the signal $(S_n-k_1 \cdot M2_n)$. For example $N_3=2^6$.

This third mean $M3_n$ may also be obtained by calculating the delta-sigma mean of the signal $(S_n-k_1 \cdot M2_n)$ with an incrementation constant $c_3$.

Then the signal $S_n+k_2 \cdot M2$ is calculated using an adder 112 and a multiplier 113. In this embodiment, the value of $k_1$ is equal to 1.

Then, calculating means 116 permit a fourth recursive mean $M4_n$ to be calculated. This fourth recursive mean $M4_n$ is obtained by the following calculation:

$$M4_n = M4_{n-1} - \frac{1}{N_4} M4_{n-1} + \frac{1}{N_4} (S_n + k_2 \cdot M2_n)$$

The time constant $1/N_4$ is chosen in function of the amplitude and the frequency of the variations of the signal $(S_n+k_2 \cdot M2_n)$. For example $N_4=26$.

It is possible that the values of $1/N_3$ and/or $1/N_4$ are constant throughout the movement detection method. It is also possible that one or both of these two values vary during the movement detection method in function of the value of $|M3_n-S_n|$ for $M3_n$ and $|M4_n-S_n|$ for $M4_n$. Consequently, a time constant $1/N_3$ may be chosen that is more rapid when $M3_n>S_n$, or even a time constant $1/N_4$ that is slower when $S_n>M4_n$.

In one variant, the third mean and/or the fourth mean may also be of the sigma-delta type, with incrementation and decrementation constants $c_3$ and $c_4$.

Preferably, a third mean $M3_n$ and a fourth mean $M4_n$ of the recursive types will be chosen.

Finally, to determine the presence or absence of movements in the captured image n, the device 100 comprises two comparators 122 and 124 which make a comparison of the signals $(M3_n-M2_n)$, obtained by a subtractor 118, and $S_n$, and of the signals $(M4_n+M2_n)$, obtained by an adder 120, and $S_n$, wherein a movement is considered as detected when $S_n>(M4_n+M2_n)$ or $S_n<(M3_n-M2_n)$.

In one variant, it is also possible that the presence or absence of movements in the captured image n is determined by comparing the signals $(M4_n+M2_n)$ and $(M3_n-M2_n)$ not with $S_n$ but with a fifth recursive type mean $M5_n$ of this signal $S_n$. This fifth recursive type mean $M5_n$ is obtained by the following calculation:

$$M5_n = M5_{n-1} - \frac{1}{N_5} M5_{n-1} + \frac{1}{N_5} S_n$$

The weighting coefficient $1/N_5$ used for this calculation is preferably rapid (for example $N_5=2^6$). The weighting coefficient $1/N_5$ is chosen in function of the amplitude and the frequency of the variations of the signal $S_n$. In this case, the device 100 comprises means of calculating this fifth mean, not shown, of which the output is sent to the input of the comparators 122 and 124 instead of the signal $S_n$.

This method is based on the generation of an envelope whose upper and lower values form threshold values which permit the presence or absence of movement to be determined. The thresholding of the variations detected is therefore adaptive.

In general, the incrementation and decrementation values $c_1$ and/or $c_2$ and/or the time constants $1/N_1$, $1/N_2$, $1/N_3$, $1/N_4$ and $1/N_5$ used in the means calculations are adapted in function of the pixel resolution of the captured images, which is to say the number of levels of grey onto which the processed signal is encoded, as well as the operating frequency of the movement detection device 100.

Figure 3:
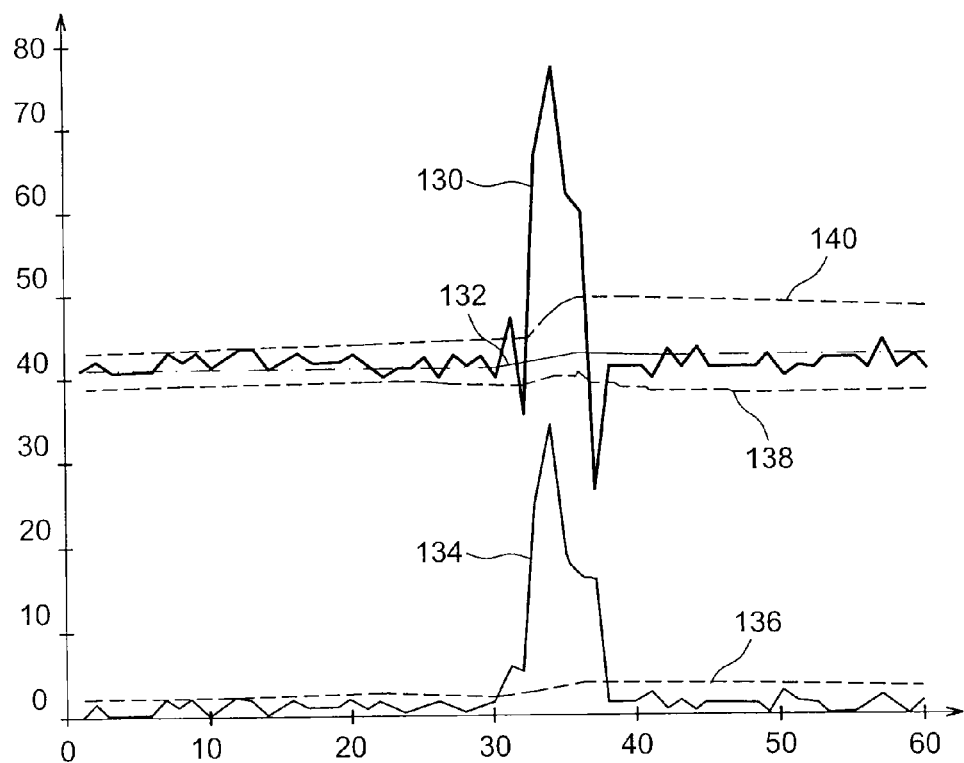
FIG. 3 shows signals obtained during the implantation of a movement detection method with a thresholding algorithm per envelope.

FIG. 3 shows an example of a signal $S_n$ from several images captured by a pixel matrix as well as the different signals calculated during a movement detection method with a thresholding algorithm per envelope as previously described.

In this FIG. 3, the x axis shows the evolution of the signals, graduated in the number of captured images, and the y axis shows the value of these signals graduated in the levels of grey. The curve 130 shows the signal $S_n$ obtained at the output of a pixel or a macropixel. It is this signal that is sent to the input of the device 100. The curve 132 shows the first mean $M1_n$, in this case recursive, obtained at the output of the calculation means 102. This first mean $M1_n$ shows the background of the image captured, which is to say the fixed element(s) captured by the pixel or the group of pixels. In FIG. 3, it can be seen that this first mean $M1_n$ varies very little, which effectively corresponds to the value of the fixed elements captured. The curve 134 shows the signal $\Delta_n$. It may be seen in FIG. 3 that this signal $\Delta_n$ follows the most significant variations of the output signal $S_n$ according to the curve 130, thus creating an estimation of the variations, which is to say of the moving elements in the captured images. Finally, the curves 136, 138 and 140 respectively show the signals $M2_n$, $M3_n$ and $M4_n$. The curves 138 and 140 show the upper and lower boundaries of the thresholding envelope calculated around the signal $S_n$. Consequently, by correctly choosing the value of the weighting coefficient for the calculation of the second mean $M2_n$, the high frequency parasite movements corresponding to the low variations recorded by the image capture device are not considered as detected movements.

Figure 4:
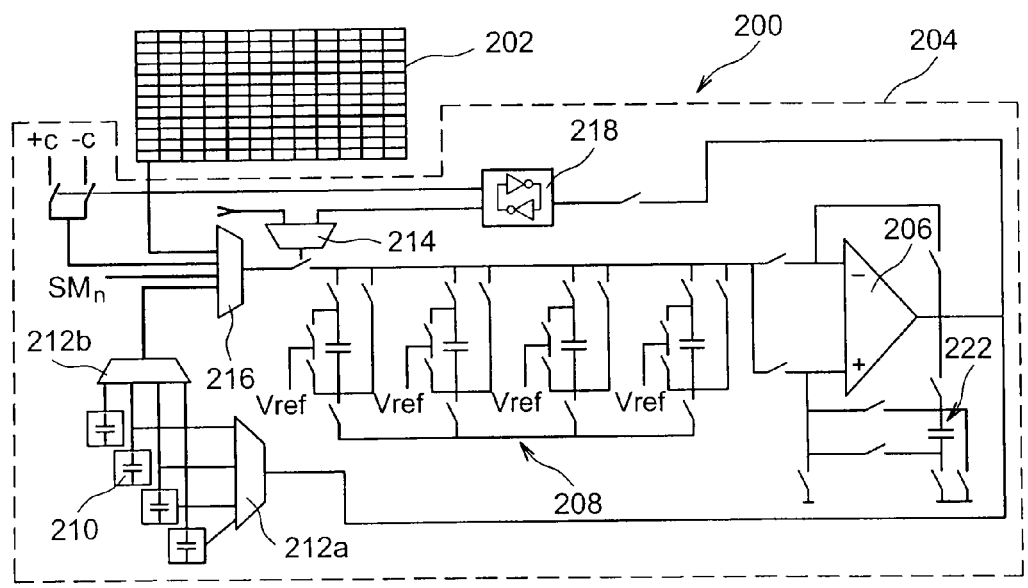
FIG. 4 shows part of an image capture device comprising an example of a movement detection device with a thresholding algorithm per envelope.

One example of an image capture device 200, or optical imaging device, permitting a movement detection method with a thresholding algorithm per envelope previously described to be implemented is shown in FIG. 4.

The image capture device 200 comprises pixel matrix 202 and a movement detection device 204. Each pixel of the matrix 202 is here formed by a photodiode and addressing and reading transistors. The movement detection method with a thresholding algorithm per envelope previously described may be applied to the signal $S_n$ supplied by a pixel, by connecting a movement detection device similar to the device 204 to each column of pixels of the matrix 202. It is also possible that the movement detection method is applied to a signal $S_n$ corresponding to the signals supplied by several pixels, for example the mean of these signals. Consequently, by considering the macropixels, it is possible to operate the image capture device 200 in low resolution zones, and only to detail these zones by using a movement detection method with a thresholding algorithm per envelope for each pixel of a macropixel when a movement is detected on this macropixel. It is therefore possible to reduce the number of movement detection devices 204 used in the image capture device 200 by only using a single movement detection device 204 per column of macropixels. A macropixel may for example be a square of 12×12 pixels, or any other value, for example 4×4 pixels as in FIG. 4. The values of each macropixel of the matrix 202 are read line by line.

The movement detection devices 204 shown in FIG. 4 comprises a comparator 206, for example an operational amplifier (or transconductance amplifier), a plurality of switched capacities 208, analogue memory registers 210 (four memory registers 210 are shown in FIG. 4 but the movement detection device 204 may comprise a different number of memory registers adapted to the number of values to be stored while the movement detection method is in use), an address demultiplexer 212a, an address multiplexer 212b, a multiplexer 214 for controlling the writing in the switched capacities 208, a multiplexer 216 supplying the values to be written in the switched capacities 208, a SRAM memory 218, and a capacitor 222.

The operation of the movement detection device 204 will now be described in relation to the implementation of the movement detection method previously described.

In the case of a first mean $M1_n$ of the recursive type, the value of the signal $M_{n-1}$ stored in one of the memory registers 210 is supplied to the input of the multiplexer 216, by means of the address multiplexer 212b. When n=0, $M_{-1}$=0. The first recursive mean $M1_n$ is then calculated. For this purpose, the signal $M_{n-1}$ is sent to the terminals of a first switched capacity 208 whose value is equal to $(N_1\_1)/N_1$. The value of the signal $M_{n-1}$ is stored at the terminals of this capacity.

The signal $S_n$ supplied by the first macropixel of the matrix 202 is then supplied to the input of the multiplexer 216. The value of the signal $S_n$ is stored at the terminals of a second switched capacity whose value $C_4$ is equal to $1/N_1$.

By connecting in parallel the two switched capacities, the signal $$M1_n = M1_{n-1} - \frac{1}{N_1}M1_{n-1} + \frac{1}{N_1}S_n$$

is obtained at the terminals of these capacities.

It is also possible that the mean $M1_n$ is a sigma-delta mean. For this purpose, the initialisation $M1_0=S_0$ is carried out by storing the value of the signal $S_0$ in one of the memory registers 210. For the following images, $M1_{n-1}$ and $S_n$ are compared by applying one of the two signals to the positive input of the comparator 206 by means of the capacitor 222 in which this signal is stored, and by applying the other of the two signals to the negative input of the comparator 206. The result obtained at the output of the comparator 206 permits one of the values $+c_1$ or $-c_1$ applied to the input of the multiplexer 216 (+c and $-c_1$ in FIG. 4) to be selected. If $M1_{n-1}<S_n$, then the value of $M1_{n-1}$ is incremented such that $M1_n=M1_{n-1}+c_1$. If $M1_{n-1}>S_n$, then the value of $M1_{n-1}$ is decremented such that $M1_n=M1_{n-1}-c_1$. In this embodiment, $c_1=1$. The addition operation of $+/-c_1$ to $M1_{n-1}$ is carried out by means of the capacities 208 by storing at the terminals two of these capacities the $+/-c_1$ and $M1_{n-1}$ values, and by connecting these capacities in series so as to carry out an addition.

Whether the mean $M1_n$ is of the recursive or sigma-delta type, its value is stored in one of the memory registers 210. In this embodiment, the movement detection device 204 comprises four memory registers 210 designed to store four different means $M1_n$, $M2_n$, $M3_n$ and $M4_n$.

The signal $\Delta_n=|M1_n-S_n|$ is then calculated. This operation may be carried out by the switched capacities 208.

In a similar manner to the calculation of the first mean $M1_n$ when the latter is of the recursive type, the calculation of the second recursive type or sigma-delta mean $M2_n$ is carried out. When $M2_n$ is of the recursive type, then two other switched capacities 208 are used respectively of values $(N_2-1)/N_2$ and $1/N_2$. When the second mean $M2_n$ is of the sigma-delta type, this second mean is calculated in a similar manner to the calculation of the first mean $M1_n$, using two values $+c_2$ and $-c_2$ applied to the input of the multiplexer 216 instead of the values $+c_1$ and $-c_1$.

Then the calculation $(S_n - k_1 \cdot M2_n)$ is carried out by the switched capacities 208, then that of the third mean $M3_n$ of this signal. Finally, the signal $(S_n + k_2 \cdot M2_n)$ and that of the fourth mean $M4_n$ of this signal are calculated.

A comparison is then made using the amplifier 206 of the signal $S_n$ and the signal $(M3_n - M2_n)$. The value obtained at the output of the amplifier 206 is representative of a detection or non-detection of a movement on the macropixel considered. If $S_n < (M3_n - M2_n)$, then it is considered that a movement has been detected on the macropixel considered.

Next, a comparison is made using the amplifier 206 of the signal $S_n$ and the signal $(M4_n + M2_n)$. The value obtained at the output of the amplifier 206 is representative of a detection or non detection of a movement on the macropixel considered. If $S_n > (M4_n + M2_n)$, then it is considered that a movement has been detected on the macropixel considered.

The operation is then repeated for the following macropixels, line after line.

In one variant, the comparison of the signal $S_n$ and the signal $(M3_n - M2_n)$ may be replaced by a comparison of a fifth recursive type mean $M5_n$ of this signal $S_n$ where the signal $(M3_n - M2_n)$. The value obtained at the output of the amplifier 206 is representative of a detection or non-detection of a movement on the macropixel considered. If $M5_n < (M3_n - M2_n)$, then it is considered that a movement has been detected on the macropixel considered. This fifth recursive mean $M5_n$ is obtained by the following calculation:

$$M5_n = M5_{n-1} - \frac{1}{N_5} M5_{n-1} + \frac{1}{N_5} S_n$$

This calculation may be carried out by the switched capacities of value $(N_5-1)/N_5$ and $1/N_5$.

In the same way, the comparison of $S_n$ and the signal $(M4_n + M2_n)$ may be replaced by a comparison of $M5_n$ and $(M4_n + M2_n)$. If $M5_n > (M4_n + M2_n)$, then it is considered that a movement has been detected on the macropixel considered.

For the mean $M2_n$, a non-null minimum threshold value may be imposed, below which this mean is not allowed to descend. This minimum threshold value $S_{M2n}$ may be applied to the input of the multiplexer 216. When the value of this mean is below this threshold value, this value is then replaced by the threshold value. For example, in this embodiment, the value of $S_{M2n}$ may be equal to about 1/50×the dynamic of $S_n$.

When a movement is detected on the macropixel, it is possible, for an image n for which the movement detection has been carried out on macropixels, to store the values of the macropixels in the memory 218, then, on the macropixel(s) where movements are recorded, to implement the movement detection methods previously described for each of the pixels of the macropixel. Consequently, the location of the movements detected may be defined precisely, without processing all of the pixels of the captured images.

It may be seen that the method may be implemented using few hardware calculation (an operational amplifier, several switched capacities with a clock frequency for the instructions of several tens of kHz and several multiplexers/demultiplexers) and memory resources (several analogue registers per pixel and a SRAM memory for example).

The device shown in FIG. 4 permits an analogue implementation of the movement detection method previously described. However, it is also possible to use a digital implementation of the movement detection methods by connecting the pixel matrix 202 to signal digital processing means, for example a circuit of the DSP or FPGA type or a microprocessor, wherein the movement detection method is programmed.

The signals obtained at the output of the movement detection devices may be used to display an image on which the background captured forms a black background onto which the moving elements detected are shown in white, for example as shown on the image on the right in FIG. 4.

The invention claimed is:

1. A movement detection method comprising at least the following steps:
    the calculation of a first mean $M1_n$ of a signal $S_n$ designed to be supplied by at least one pixel of a pixel matrix which corresponds to an n-th captured image, in function of the value of the signal $S_n$ and/or a previous value $M1_{n-1}$;
    the calculation of a signal $\Delta_n = |M1_n - S_n|$;
    the calculation of a second mean $M2_n$ of the signal $\Delta_n$ in function of a previous value $M2_{n-1}$ and/or the value of the signal $\Delta_n$;
    the calculation of a third mean $M3_n$ of the signal $(S_n - k_1 \cdot M2_n)$ in function of a previous value $M3_{n-1}$ and/or the value of the signal $(S_n - k_1 \cdot M2_n)$;
    the calculation of a fourth mean $M4_n$ of the signal $(S_n + k_2 \cdot M2_n)$ in function of a previous value $M4_{n-1}$ and/or the value of the signal $(S_n + k_2 \cdot M2_n)$;
    detecting a movement from the result of at least one comparison made of the signals $S_n$, $(M3_n - M2_n)$ and $(M4_n + M2_n)$;
    where n: natural whole number;
    and $k_1$ and $k_2$: non-null positive real numbers.

2. The method according to claim 1, wherein the first mean $M1_n$ is obtained from the following equation:

$$M1_n = M1_{n-1} - \frac{1}{N_1} M1_{n-1} + \frac{1}{N_1} S_n,$$

where $M1_{-1} = 0$, and
$1/N_1$: non-null positive real number.

3. The method according to claim 1, wherein the first mean $M1_n$ is obtained at least by the following calculation steps:
$M1_0 = S_0$;
and for $n > 0$:
$M1_n = M1_{n-1} + c_1$ when $M1_{n-1} < S_n$;
$M1_n = M1_{n-1} - c_1$ when $M1_{n-1} > S_n$;
where $c_1$: non-null positive real number.

4. The method according to claim 1, wherein the second mean $M2_n$ is obtained from the following equation:

$$M2_n = M2_{n-1} - \frac{1}{N_2} M2_{n-1} + \frac{1}{N_2} \Delta_n,$$

where $M2_{-1} = 0$, and
$1/N_2$: non-null positive real number.

5. The method according to claim 1, wherein the second mean $M2_n$ is obtained at least by the following calculation steps:
$M2_0 = \Delta_0$;
and for n>0:
$M2_n = M2_{n-1} + c_2$ when $M2_{n-1} < \Delta_n$;
$M2_n = M2_{n-1} - c_2$ when $M2_{n-1} > \Delta_n$;
where $c_2$: non-null positive real number.

6. The method according to claim 1, wherein the third mean $M3_n$ is obtained from the following equation:

$$M3_n = M3_{n-1} - \frac{1}{N_3} M3_{n-1} + \frac{1}{N_3}(S_n - k_1 \cdot M2_n),$$

where $M3_{-1} = 0$, and
$1/N_3$: non-null positive real number.

7. The method according to claim 6, wherein the value of $1/N_3$ is adjusted in function of the value $|M3_n - S_n|$:
when $M3_n < S_n$, the value of $1/N_3$ verify the relation: period $(S_n)/\ln(1-1/N_3)^{-1} > 1$ s;
when $M3_n > S_n$, the value of $1/N_3$ verify the relation: period $(S_n)/\ln(1-1/N_3)^{-1} < 0.5$ s.

8. The method according to claim 1, wherein the third mean $M3_n$ is obtained at least by the following calculation steps:
$M3_0 = (S_0 - k_1 \cdot M2_0)$
and for n>0:
$M3_n = M3_{n-1} + c_3$ when $M3_{n-1} < (S_n - k_1 \cdot M2_n)$;
$M3_n = M3_{n-1} - c_3$ when $M3_{n-1} > (S_n - k_1 \cdot M2_n)$
where $c_3$: non-null positive real number.

9. The method according to claim 1, wherein the fourth mean $M4_n$ is obtained from the following equation:

$$M4_n = M4_{n-1} - \frac{1}{N_4} M4_{n-1} + \frac{1}{N_4}(S_n + k_2 \cdot M2_n),$$

where $M4_{-1} = 0$, and
$1/N_4$: non-null positive real number.

10. The method according to claim 9, wherein the value of $1/N_4$ is adjusted in function of the value $|M4_n - S_n|$:
when $M4_n < S_n$, the value of $1/N_4$ verify the relation: period $(S_n)/\ln(1-1/N_4)^{-1} < 0.5$ s;
when $M4_n > S_n$, the value of $1/N_4$ verify the relation: period $(S_n)/\ln(1-1/N_4)^{-1} > 1$ s.

11. The method according to claim 1, wherein the fourth mean $M4_n$ is obtained at least by the following calculation steps:
$M4_0 = (S_0 + k_2 \cdot M2_0)$
and for n>0:
$M4_n = M4_{n-1} + c_4$ when $M4_{n-1} < (S_n + k_2 \cdot M2_n)$;
$M4_n = M4_{n-1} - c_4$ when $M4_{n-1} > (S_n + k_2 \cdot M2_n)$;
where $c_4$: non-null positive real number.

12. The method according to claim 1, wherein the value of the second mean $M2_n$ is greater than a second non-null minimum threshold value $S_{M2n}$.

13. The method according to claim 12, the value of $S_{M2n}$ is comprised between approximately $1/250 \times$ the dynamic of the signal $S_n$ and $1/25 \times$ the dynamic of the signal $S_n$.

14. The method according to claim 1, wherein said comparison is made of the signals $S_n$ and $(M3_n - M2_n)$ and of the signals $S_n$ and $(M4_n + M2_n)$, wherein a movement is considered as detected when $S_n > (M4_n + M2_n)$ or $S_n < (M3_n - M2_n)$.

15. The method according to claim 1, further comprising, between the calculation step of the fourth mean $M4_n$ of the signal $(S_n + M2_n)$ and the comparison step, a calculation step of a fifth mean $M5_n$ of the signal $S_n$ in function of a previous value $M5_{n-1}$ and/or the value of the signal $S_n$, wherein said comparison is made on the signals $M5_n$ and $(M3_n - M2_n)$ and on the signals $M5_n$ and $(M4_n + M2_n)$, wherein a movement is considered as detected when $M5_n > (M4_n + M2_n)$ or $M5_n < (M3_n - M2_n)$.

16. The method according to claim 15, wherein the fifth mean $M5_n$ is obtained from the following equation:

$$M5_n = M5_{n-1} - \frac{1}{N_5} M5_{n-1} + \frac{1}{N_5} S_n,$$

where $M5_{-1} = 0$, and
$1/N_5$: non-null positive real number.

17. A movement detection device at least comprising:
means of calculating a first mean $M1_n$ of a signal $S_n$ designed to be supplied by at least one pixel of a pixel matrix and corresponding to a n-th captured image, in function of the value of the signal $S_n$ and/or a previous value $M1_{n-1}$;
means of calculating a signal $\Delta_n = |M1_n - S_n|$;
means of calculating a second mean $M2_n$ of the signal $\Delta_n$ in function of a previous value $M2_{n-1}$ and/or the value of the signal $\Delta_n$;
means of calculating a third mean $M3_n$ of the signal $(S_n - k_1 \cdot M2_n)$ in function of a previous value $M3_{n-1}$ and/or the value of the signal $(S_n - k_1 \cdot M2_n)$;
means of calculating a fourth mean $M4_n$ of the signal $(S_n + k_2 \cdot M2_n)$ in function of a previous value $M4_{n-1}$ and/or the value of the signal $(S_n + k_2 \cdot M2_n)$;
wherein a movement is detected from the result obtained at the output of a means of comparison which make at least one comparison of the signals $S_n$, $(M3_n - M2_n)$ and $(M4_n + M2_n)$
where n: natural whole number;
and $k_1$ and $k_2$: non-null positive real numbers.

18. The device according to claim 17, wherein the means of calculating the first mean $M1_n$ carry out at least the following operation:

$$M1_n = M1_{n-1} - \frac{1}{N_1} M1_{n-1} + \frac{1}{N_1} S_n,$$

where $M1_{-1} = 0$, and
$1/N_1$: non-null positive real number.

19. The device according to claim 17, wherein the means of calculating the first mean $M1_n$ at least comprise:
means of initialising the value of $M1_0$ to the value of $S_0$;
means of comparing the value of the signal $M1_{n-1}$ and the value of the signal $S_n$;
means of incrementing and decrementing the value of $M1_n$ by a constant $c_1$, where $c_1$: non-null positive real number.

20. The device according to claim 17, wherein the means of calculating the second mean $M2_n$ carry out at least the following operation:

$$M2_n = M2_{n-1} - \frac{1}{N_2} M2_{n-1} + \frac{1}{N_2} \Delta_n,$$

where $M2_{-1} = 0$, and
$1/N_2$: non-null positive real number.

21. The device according to claim 17, wherein the means of calculating the second mean $M2_n$ at least comprise:
- means of initialising the value of $M2_0$ to the value of $\Delta_0$;
- means of comparing the value of the signal $M2_{n-1}$ and the value of the signal $\Delta_n$;
- means of incrementing and decrementing the value of $M2_n$ by a constant $c_2$, where $c_2$: non-null positive real number.

22. The device according to claim 17, wherein the means of calculating the third mean $M3_n$ carry out at least the following operation:

$$M3_n = M3_{n-1} - \frac{1}{N_3} M3_{n-1} + \frac{1}{N_3}(S_n - k_1 \cdot M2_n),$$

where $M3_{-1}=0$, and
$1/N_3$: positive real number.

23. The device according to claim 22, wherein the means of calculating the third mean $M3_n$ further comprise means of adjusting the value of $1/N_3$ in function of the value $|M3_n-S_n|$ such that:
- when $M3_n<S_n$, the value of $1/N_3$ verify the relation: period $(S_n)/\ln(1-1/N_3)-^{-1}>1$ s;
- when $M3_n>S_n$, the value of $1/N_3$ verify the relation: period $(S_n)/\ln(1-1/N_3)^{-1}<0.5$ s.

24. The device according to claim 17, wherein the means of calculating the third mean $M3_n$ at least comprise:
- means of initialising the value of $M3_0$ to the value of $(S_0-k_1 \cdot M2_0)$;
- means of comparing the value of the signal $M3_{n-1}$ and the value of the signal $(S_n-k_1 \cdot M2_n)$;
- means of incrementing and decrementing the value of $M3_n$ by a constant $c_3$, where $c_3$: non-null positive real number.

25. The device according to claim 17, wherein the means of calculating the fourth mean $M4_n$ carry out at least the following operation:

$$M4_n = M4_{n-1} - \frac{1}{N_4} M4_{n-1} + \frac{1}{N_4}(S_n + k_2 \cdot M2_n),$$

where $M4_{-1}=0$, and
$1/N_4$: non-null positive real number.

26. The device according to claim 25, wherein the means of calculating the fourth mean $M4_n$ further comprise means of adjusting the value of $1/N_4$ in function of the value $|M4_n-S_n|$ such that:
- when $M4_n<S_n$, the value of $1/N_4$ verify the relation: period $(S_n)/\ln(1-1/N_4)-^{-1}<0.5$ s;
- when $M4_n>S_n$, the value of $1/N_4$ verify the relation: period $(S_n)/\ln(1-1/N_4)^{-1}>1$ s.

27. The device according to claim 17, wherein the means of calculating the fourth mean $M4_n$ at least comprise:
- means of initialising the value of $M4_0$ to the value of $(S_0+k_2 \cdot M2_0)$;
- means of comparing the value of the signal $M4_{n-1}$ and the value of the signal $(S_n+k_2 \cdot M2_n)$;
- means of incrementing and decrementing the value of $M4_n$ by a constant $c_4$, where $c_4$: non-null positive real number.

28. The device according to claim 17, wherein the means of comparison are means of comparing the signals $S_n$ and $(M3_n-M2_n)$ and means of comparing the signals $S_n$ and $(M4_n+M2_n)$, wherein a movement is considered as detected when $S_n>(M4_n+M2_n)$ or $S_n<(M3_n-M2_n)$.

29. The device according to claim 17, further comprising means of calculating a fifth mean $M5_n$ of the signal $S_n$ in function of a previous value $M5_{n-1}$ and/or the value of the signal $S_n$, wherein the means of comparison are means of comparing the signals $M5_n$ and $(M3_n-M2_n)$ and means of comparing the signals $M5_n$ and $(M4_n+M2_n)$, wherein a movement is considered as detected when $M5_n>(M4_n+M2_n)$ or $M5_n<(M3_n-M2_n)$.

30. The device according to claim 29, wherein the means of calculating the fifth mean $M5_n$ carry out at least the following operation:

$$M5_n = M5_{n-1} - \frac{1}{N_5} M5_{n-1} + \frac{1}{N_5} S_n,$$

where $M5_{-1}=0$, and
$1/N_5$: non-null positive real number.

31. An image capture device comprising at least one pixel matrix and one movement detection device according to claim 17.

* * * * *